United States Patent
Shida et al.

(10) Patent No.: US 7,049,013 B2
(45) Date of Patent: May 23, 2006

(54) MAGNETIC RECORDING MEDIUM AND METHOD OF PRODUCING THE SAME, AND MAGNETIC STORAGE APPARATUS

(75) Inventors: Kazuhisa Shida, Higashine (JP); Atsushi Endo, Higashine (JP); Chiaki Okuyama, Higashine (JP); Akira Kikuchi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/772,051

(22) Filed: Jan. 29, 2001

(65) Prior Publication Data

US 2002/0102440 A1 Aug. 1, 2002

(51) Int. Cl.
G11B 5/66 (2006.01)
G11B 5/70 (2006.01)

(52) U.S. Cl. ............... 428/829; 428/667; 428/900; 427/131

(58) Field of Classification Search ............ 428/674 T, 428/694 TM, 694 TS, 694 MMM, 457, 829
See application file for complete search history.

(56) References Cited

U.S. PATENT DOCUMENTS 5,583,727 A * 12/1996 Parkin et al. ............... 360/113
5,772,857 A * 6/1998 Zhang ..................... 204/192.2
5,789,056 A * 8/1998 Bian et al. .................. 428/332
6,150,015 A * 11/2000 Bertero et al. .............. 428/332
6,303,217 B1 * 10/2001 Malhotra et al. ........... 428/332
6,623,873 B1 * 9/2003 Matsuda et al. ....... 428/694 TS

FOREIGN PATENT DOCUMENTS

| JP | 05114128 A | 5/1993 |
| JP | 06243454 A | 9/1994 |
| JP | 10320740 A | 12/1998 |

OTHER PUBLICATIONS

IEEE Transactions on Magnetics, vol. 28, #5, Sep. 1992, Paik et al. pp 3084-3086.*
IEEE Transactions on Magnetics, vol. 27, #6, Nov. 1991, Tani et al. pp 4736-4733.*

* cited by examiner

Primary Examiner—Holly Rickman
(74) Attorney, Agent, or Firm—Greer, Burns, & Crain, Ltd.

(57) ABSTRACT

A magnetic recording medium is provided with a substrate, and a magnetic layer made of a CoCr-based alloy and having a multi-layer structure and disposed above the substrate. The multi-layer structure has a first magnetic layer disposed above the substrate and at least one second magnetic layer disposed on the first magnetic layer on an opposite side from the substrate. The first magnetic layer has a Cr-content larger than that of the second magnetic layer, and has a larger sum total content of nonmagnetic elements which are other than Cr and have a larger atomic radius than Co than the second magnetic layer.

9 Claims, 14 Drawing Sheets

MAGNETIC RECORDING MEDIUM AND METHOD OF PRODUCING THE SAME, AND MAGNETIC STORAGE APPARATUS

BACKGROUND OF THE INVENTION

1. Field of the Invention

The present invention generally relates to magnetic recording media and methods of producing the same and magnetic storage apparatuses, and more particularly to a magnetic recording medium which is suited for high-density magnetic recording, a method of producing such a magnetic recording medium, and a magnetic storage apparatus which uses such a magnetic recording medium.

2. Description of the Related Art

Due to the progress made in the information processing technology, there are demands to improve the performance, such as increased storage capacity and high transfer rates, of magnetic disk apparatuses which are often used as external storage units of computers. In order to improve the performance of the magnetic disk apparatus, it is necessary to improve the performance of the magnetic recording medium which records information, and it is essential to reduce the media noise and to increase the coercivity of the magnetic recording medium.

Conventionally, various magnetic recording media having a magnetic layer with a multi-layer structure have been proposed. For example, a Japanese Laid-Open Patent Application No.5-114128 proposes a magnetic recording medium having a magnetic layer with a multi-layer structure, and this multi-layer structure is made up of a lower magnetic layer made of a CoCrTa-based alloy and an upper magnetic layer made of a CoCrPt-based alloy. In this proposed magnetic recording medium, the coercivity of the magnetic layer having the multi-layer structure does not become higher than the coercivity of a magnetic layer having a single-layer structure made up of a similar alloy. Hence, compared to the magnetic layer having the single-layer structure, the magnetic layer having the multi-layer structure has a reduced media noise, but the recording and reproducing resolution is not improved and it is difficult to obtain a high signal-to-noise (S/N) ratio at a high recording density.

On the other hand, a Japanese Laid-Open Patent Application No.6-243454 proposes a magnetic recording medium having a magnetic layer in which a normally-magnetic region with low Co concentration and a high Cr concentration is disposed between two regions with a high Co concentration, wherein a plurality of such regions are provided in a direction in which a thickness of the magnetic recording medium is taken. According to this proposed magnetic recording medium, the media noise is reduced because the decreased mutual interaction of the regions in the magnetic layer. However, since the magnetic layer basically has a multi-layer structure in which the magnetic layers have the same composition, the coercivity does not become higher than the coercivity of the magnetic layer having the single-layer structure made up of a similar alloy. For this reason, compared to the magnetic layer having the single-layer structure, the recording and reproducing resolution is not improved and it is difficult to obtain a high S/N ratio at a high recording density.

Furthermore, a Japanese Laid-Open Patent Application No.10-320740 proposes a magnetic recording medium having a multi-layer structure using alloys such as a CoCrPt-based alloy, CoCrPtTa-based alloy and a CoCrPtNi-based alloy, wherein lower magnetic layers have a higher Pr concentration than upper magnetic layers and the upper magnetic layers have higher Cr concentrations than the lower magnetic layers. In this proposed magnetic recording medium, the coercivity is adjusted by the Pt-content of the upper magnetic layers, and thus, the coercivity is greatly affected by the magnetic characteristic of the upper magnetic layers. In addition, because the upper magnetic layers have a larger Cr-content than the lower magnetic layers, the recording and reproducing resolution may deteriorate in a high-frequency region of the recording and reproducing characteristic.

As described above, the previously proposed magnetic recording media employ the multi-layer structure for the magnetic layer, mainly for the purposes of reducing the media noise. In addition, in the magnetic recording media having the magnetic layer with the multi-layer structure, the thickness of each of the magnetic layers in the multi-layer structure becomes small compared to the thickness of the magnetic layer having the single-layer structure.

FIG. 1 is a diagram for explaining a decrease in coercivity with decreasing thickness of a CoCr-based magnetic layer having a single-layer structure. In FIG. 1, the ordinate indicates the coercivity Hc ($\frac{1}{4}\pi$*kA/m) and the abscissa indicates the thickness (nm) of the magnetic layer having the single-layer structure. As shown in FIG. 1, the coercivity decreases as the thickness of the magnetic layer having the single-layer structure decreases. Because of this tendency for the coercivity to decrease with decreasing magnetic layer thickness, it was considered extremely difficult to obtain a high coercivity with the magnetic layer having the multi-layer structure. Consequently, when the magnetic layer having the multi-layer structure is employed, the recording and reproducing resolution is low, and even if the media noise is slightly reduced, it was difficult to obtain a high S/N ratio for the high-density recording.

SUMMARY OF THE INVENTION

Accordingly, it is a general object of the present invention to provide a novel and useful magnetic recording medium and method of producing the same and magnetic storage apparatus, in which the problems described above are eliminated.

Another and more specific object of the present invention is to provide a magnetic recording medium and method of producing the same and magnetic storage apparatus, which can realize a high coercivity, a high recording and reproducing resolution, a reduced media noise and a high S/N ratio, even though using a multi-layer structure for a magnetic layer, so that it is possible to carry out high-density recording and reproduction with respect to the magnetic recording medium.

Still another object of the present invention is to provide a magnetic recording medium comprising a substrate, and a magnetic layer made of a CoCr-based alloy and having a multi-layer structure and disposed above the substrate, where the multi-layer structure has a first magnetic layer disposed above the substrate and at least one second magnetic layer disposed on the first magnetic layer on an opposite side from the substrate, and the first magnetic layer has a Cr-content larger than that of the second magnetic layer, and has a larger sum total content of nonmagnetic elements which are other than Cr and have a larger atomic radius than Co than the second magnetic layer. According to the magnetic recording medium of the present invention, it is possible to realize a high coercivity, a high recording and reproducing resolution, a reduced media noise and a high S/N ratio, even though using the multi-layer structure for the magnetic layer, so that it is possible to carry out high-density recording and reproduction with respect to the magnetic recording medium.

A further object of the present invention is to provide a method of producing a magnetic recording medium which includes a magnetic layer made of a CoCr-based alloy and having a multi-layer structure, comprising the steps of (a) forming a first magnetic layer on a base layer, and (b) forming at least one second magnetic layer on the first magnetic layer, where the steps (a) and (b) are carried out so that a Cr-content of the first magnetic layer is larger than that of the second magnetic layer, and a sum total content of nonmagnetic elements which are other than Cr and have a larger atomic radius than Co in the first magnetic layer is larger than that of the second magnetic layer. According to the method of producing the magnetic recording medium of the present invention, it is possible to realize a high coercivity, a high recording and reproducing resolution, a reduced media noise and a high S/N ratio, even though using the multi-layer structure for the magnetic layer, so that it is possible to carry out high-density recording and reproduction with respect to the magnetic recording medium.

Another object of the present invention is to provide a magnetic storage apparatus comprising a head, and at least one magnetic recording medium provided with a substrate, and a magnetic layer made of a CoCr-based alloy, having a multi-layer structure and disposed above the substrate, where the multi-layer structure has a first magnetic layer disposed above the substrate and at least one second magnetic layer disposed on the first magnetic layer on an opposite side from the substrate, and the first magnetic layer has a Cr-content larger than that of the second magnetic layer, and has a larger sum total content of nonmagnetic elements which are other than Cr and have a larger atomic radius than Co than the second magnetic layer. According to the magnetic storage apparatus of the present invention, it is possible to realize a high coercivity, a high recording and reproducing resolution, a reduced media noise and a high S/N ratio, even though using the multi-layer structure for the magnetic layer, so that it is possible to carry out high-density recording and reproduction with respect to the magnetic recording medium.

Other objects and further features of the present invention will be apparent from the following detailed description when read in conjunction with the accompanying drawings.

DESCRIPTION OF THE PREFERRED EMBODIMENTS

Figure 1:
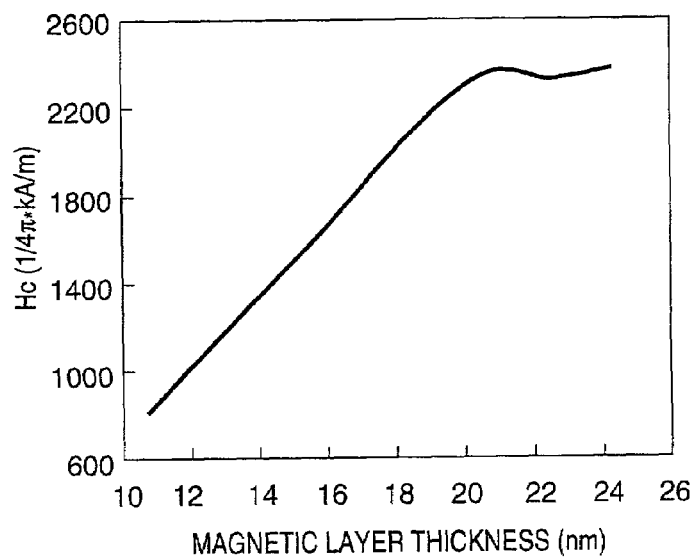
FIG. 1 is a diagram for explaining a decrease in coercivity with decreasing thickness of a magnetic layer having a single-layer structure.
Figure 2:
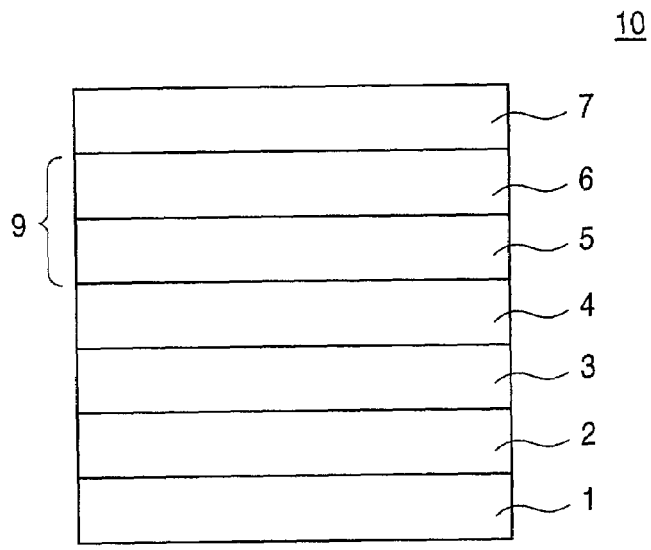
FIG. 2 is a cross sectional view showing an important part of a first embodiment of a magnetic recording medium according to the present invention.

FIG. 2 is a cross sectional view showing an important part of a first embodiment of a magnetic recording medium according to the present invention. This first embodiment of the magnetic recording medium is produced by a first embodiment of a method of producing a magnetic recording medium according to the present invention.

A magnetic recording medium 10 shown in FIG. 2 generally includes a nonmagnetic substrate 1, a first underlayer 2, a second underlayer 3, an intermediate layer 4, a lower magnetic layer 5, an upper magnetic layer 6, and a protection layer 7. The lower and upper magnetic layers 5 and 6 form a magnetic layer 9 having a multi-layer structure. Of course, the number of magnetic layers forming the multi-layer structure is not limited to two.

The nonmagnetic substrate 1 is made of an Al substrate having a surface which is plated with a NiP layer and is subjected to a texturing process. The first underlayer 2 is made of a Cr-based alloy having a thickness of 6 nm, the second underlayer 3 is made of a CrMo-based alloy having a thickness of 3 nm, and the intermediate layer 4 is made of a Co-based alloy having a thickness of 2 nm. The lower and upper magnetic layers 5 and 6 are made of a CoCr-based alloy including at least one element selected from a group of nonmagnetic elements of Pt, Ta, W and B. For example, the lower magnetic layer 5 is made of a $Co_{61}Cr_{24}Pt_{12}B_3$-based alloy having a thickness of 11 nm, and the upper magnetic layer 6 is made of a $Co_{66}Cr_{20}Pt_{10}B_4$-based alloy having a thickness of 9 nm, where the subscripts affixed to each element indicates at %.

According to this first embodiment of the method of producing the magnetic recording medium, the inside of a sputtering chamber of a known sputtering apparatus (not shown) is exhausted to $4 \times 10^{-5}$ Pa or less prior to the sputtering. The nonmagnetic substrate 1 is heated to a substrate temperature of 220° C., and Ar gas is introduced into the sputtering chamber to maintain the pressure inside the sputtering chamber to $6.7 \times 10^{-1}$ Pa. In this state, the first and second underlayers 2 and 3, the intermediate layer 4, the lower and upper magnetic layers 5 and 6, and the protection layer 7 are successively deposited by continuous sputtering.

In this first embodiment, a Cr-content of the CoCr-based alloy is larger for the lower magnetic layer 5 than the upper magnetic layer 6. Furthermore, a sum total content of Pt having a larger atomic radius than Co is larger for the lower magnetic layer 5 than the upper magnetic layer 6. In other words, a sum total content of the nonmagnetic elements having a larger atomic radius than Co and included in the CoCr-based alloy is larger for the lower magnetic layer 5 than the upper magnetic layer 6.

Figure 3:
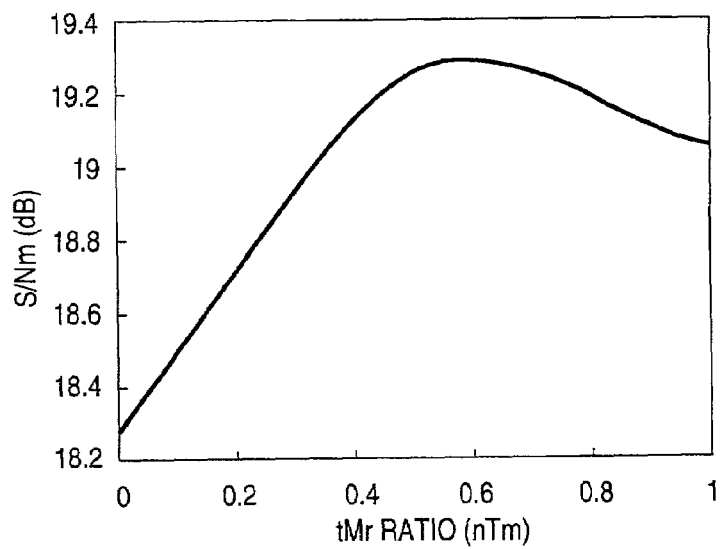
FIG. 3 is a diagram showing a relationship between a S/Nm ratio and a magnetic layer thickness and remanence magnetization product tMr ratio of the first embodiment where the Cr-content of the lower magnetic layer is larger than that of the upper magnetic layer.

FIG. 3 is a diagram showing a relationship between a media signal-to-noise (S/Nm) ratio (dB) and a magnetic layer thickness and remanence magnetization product tMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where the Cr-content of the lower magnetic layer 5 is larger than that of the upper magnetic layer 6, tMr denotes a product of a magnetic layer thickness t and a remanence magnetization Mr.

In FIG. 3, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 3, it was confirmed that the S/Nm ratio is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 4:
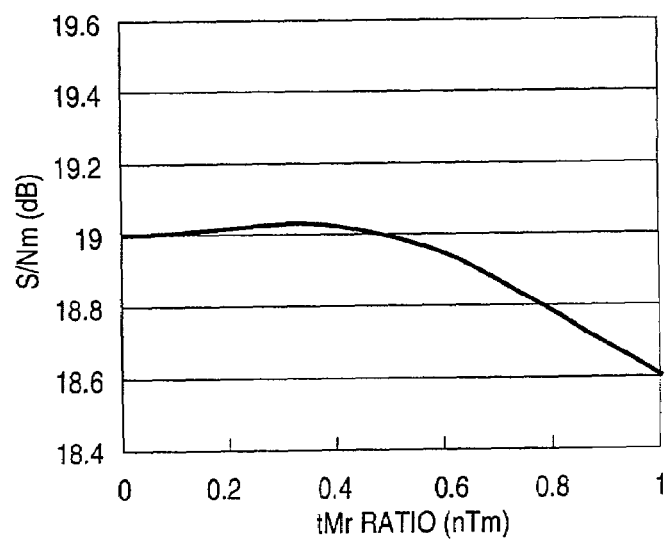
FIG. 4 is a diagram showing a relationship between the S/Nm ratio and the magnetic layer thickness and remanence magnetization product tMr ratio for a case where the Cr-content of the upper magnetic layer is larger than that of the lower magnetic layer.

On the other hand, FIG. 4 is a diagram, for comparison purposes, showing a relationship between the S/Nm ratio (dB) and the tMr ratio (nTm) of a $Co_{64}Cr_{22}Pt_{10}Ta_2B_2$-based lower magnetic layer 5 and a $Co_{66}Cr_{23}Pt_9B_2$-based upper magnetic layer 6 for a case where the Cr-content of the upper magnetic layer 6 is larger than that of the lower magnetic layer 5.

In FIG. 4, the magnetic layer 9 is made up solely of the upper magnetic layer 6 when the value along the abscissa is "0", and the magnetic layer 9 is made up solely of the lower magnetic layer 5 when the value along the abscissa is "1". Similar results were obtained for a CoCrPtB-based lower magnetic layer 5 and a CoCrPtB-based upper magnetic layer 6 when the Cr-content of the upper magnetic layer 6 is larger than or equal to that of the lower magnetic layer 5. As may be seen from FIG. 4, it was confirmed that the S/Nm ratio is not improved by the multi-layer structure of the magnetic layer 9 as compared to the case where the magnetic layer 9 is made up solely of the upper magnetic layer 6 or the lower magnetic layer 5, when the Cr-content of the upper magnetic layer 6 is larger than or equal to that of the lower magnetic layer 5.

Figure 5:
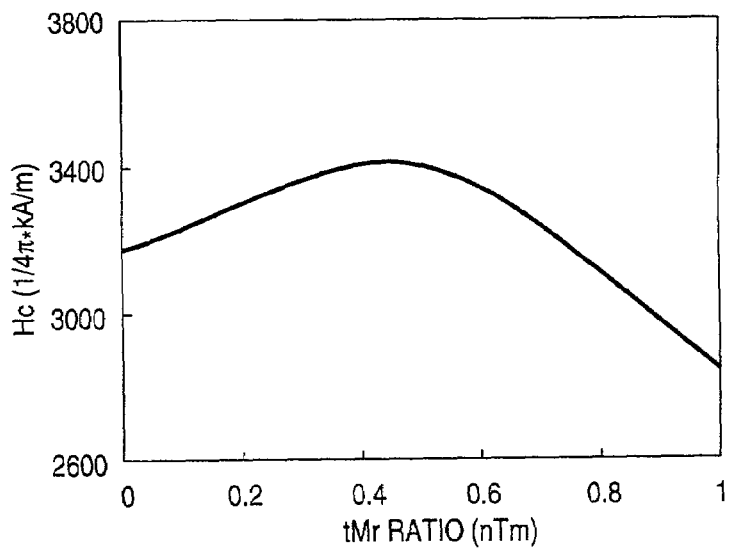
FIG. 5 is a diagram showing a relationship between a coercivity Hc and the TMr ratio of the lower magnetic layer and the upper magnetic layer of the first embodiment where the Cr-content of the lower magnetic layer is larger than that of the upper magnetic layer.

FIG. 5 is a diagram showing a relationship between a coercivity Hc (¼π*kA/m) and the TMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where the Cr-content of the lower magnetic layer 5 is larger than that of the upper magnetic layer 6, tMr denotes a product of a magnetic layer thickness t and a remanence magnetization Mr.

In FIG. 5, the magnetic layer 9 is made up solely of the upper magnetic layer 6 when the value along the abscissa is "0", and the magnetic layer 9 is made up solely of the lower magnetic layer 5 when the value along the abscissa is "1". In addition, the coercivity Hc was measured along a direction in which a track on the magnetic recording medium 10 extends, that is, in a circumferential direction in the case where the magnetic recording medium is a magnetic disk, using a vibrating sample magnetometer. Because the remanence magnetization Mr differs for the lower and upper magnetic layers 5 and 6, the lower and upper magnetic layers 5 and 6 were deposited so that the tMr ratio becomes 6.0 nTm and constant even when a ratio of the thicknesses of the lower and upper magnetic layers 5 and 6 changes, when producing the magnetic recording medium 10 which is measured of the coercivity Hc. As may be seen from FIG. 5, it was confirmed that the coercivity Hc is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 6:
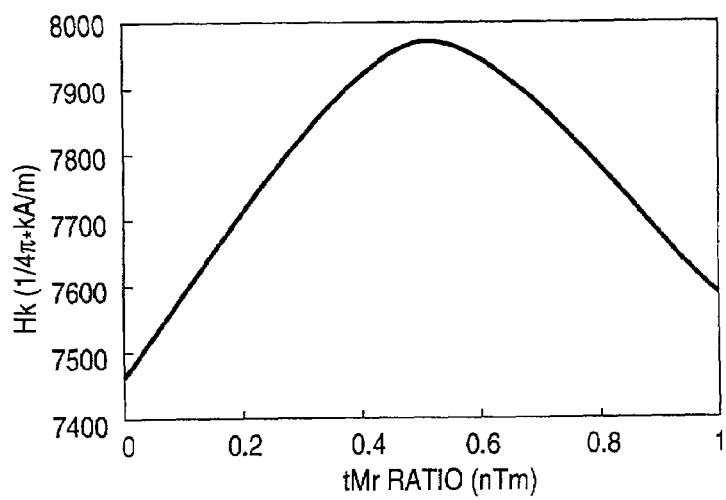
FIG. 6 is a diagram showing a relationship between a magnetic anisotropy field Hk and the TMr ratio of the lower magnetic layer and the upper magnetic layer of the first embodiment where the Cr-content of the lower magnetic layer is larger than that of the upper magnetic layer.

FIG. 6 is a diagram showing a relationship between a magnetic anisotropy field Hk ($\frac{1}{4}\pi$*kA/m) and the TMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where the Cr-content of the lower magnetic layer 5 is larger than that of the upper magnetic layer 6, tMr denotes a product of a magnetic layer thickness t and a remanence magnetization Mr.

In FIG. 6, the magnetic layer 9 is made up solely of the upper magnetic layer 6 when the value along the abscissa is "0", and the magnetic layer 9 is made up solely of the lower magnetic layer 5 when the value along the abscissa is "1". In addition, the magnetic anisotropy field Hk was measured at room temperature along a direction in which a track on the magnetic recording medium 10 extends, that is, in a circumferential direction in the case where the magnetic recording medium is a magnetic disk, using a torque magnetometer. As may be seen from FIG. 6, it was confirmed that the magnetic anisotropy field Hk is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 7:
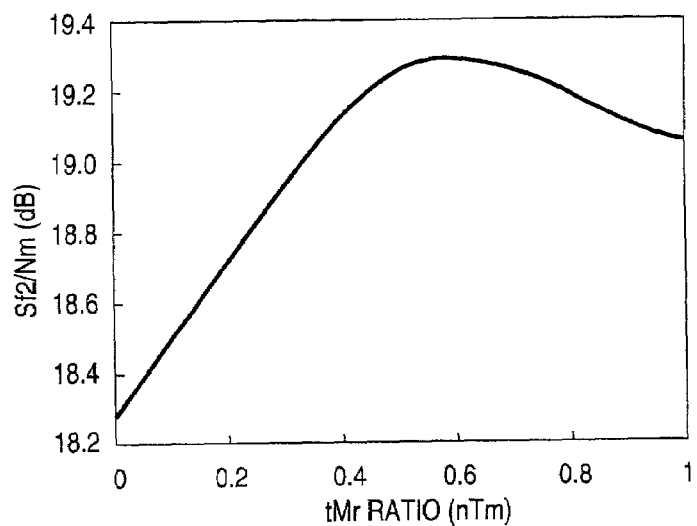
FIG. 7 is a diagram showing a relationship between a media signal-to-noise ratio (Sf2/Nm) at a recording density of 530 kfci and the tMr ratio of the lower magnetic layer and the upper magnetic layer of the first embodiment where the Cr-content of the lower magnetic layer is larger than that of the upper magnetic layer.

FIG. 7 is a diagram showing a relationship between a media signal-to-noise ratio (Sf2/Nm) (dB) at a recording density of 530 kfci and the tMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where the Cr-content of the lower magnetic layer 5 is larger than that of the upper magnetic layer 6.

In FIG. 7, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 7, it was confirmed that the Sf2/Nm ratio is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 8:
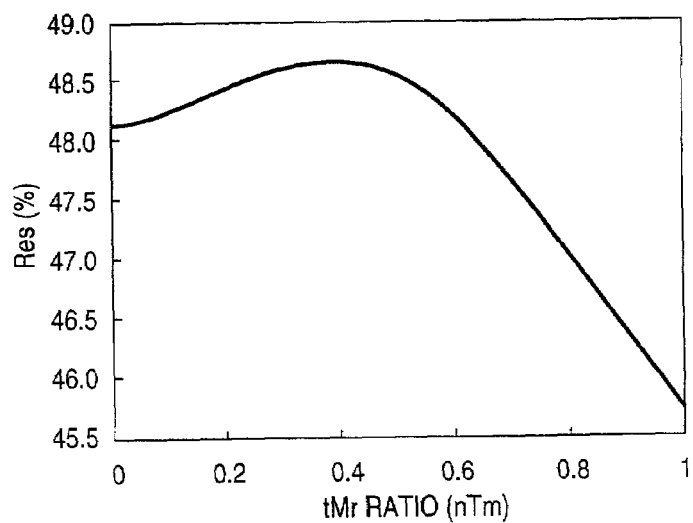
FIG. 8 is a diagram showing a relationship between a recording and reproducing resolution Res and the tMr ratio of the lower magnetic layer and the upper magnetic layer of the first embodiment where the Cr-content of the lower magnetic layer is larger than that of the upper magnetic layer.

FIG. 8 is a diagram showing a relationship between a recording and reproducing resolution Res (%) and the tMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where the Cr-content of the lower magnetic layer 5 is larger than that of the upper magnetic layer 6.

In FIG. 8, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 8, it was confirmed that the recording and reproducing resolution Res is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 9:
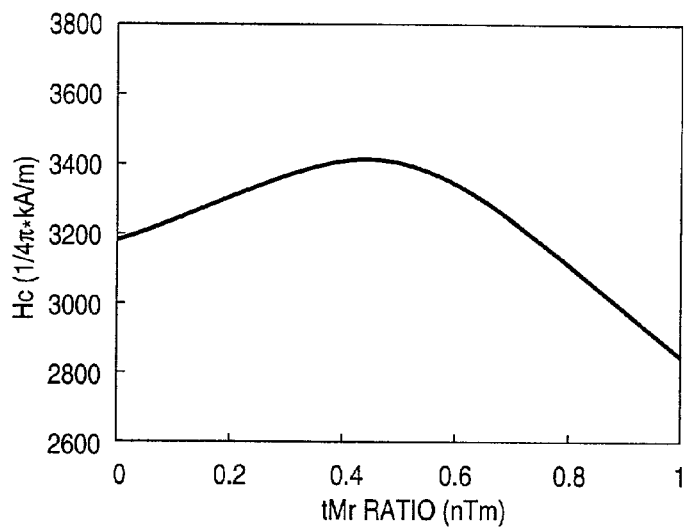
FIG. 9 is a diagram showing a relationship between a coercivity Hc and the TMr ratio of the lower magnetic layer and the upper magnetic layer of the first embodiment where a sum total content of the nonmagnetic elements having a larger atomic radius than Co and included in the CoCr-based alloy is larger for the lower magnetic layer than the upper magnetic layer.

FIG. 9 is a diagram showing a relationship between a coercivity Hc ($\frac{1}{4}\pi$*kA/m) and the TMr ratio (nTm) of the $Co_{61}Cr_{24}Pt_{12}B_3$-based lower magnetic layer 5 and the $Co_{66}Cr_{20}Pt_{10}B_4$-based upper magnetic layer 6 of this first embodiment, where a sum total content of the nonmagnetic elements having a larger atomic radius than Co and included in the CoCr-based alloy is larger for the lower magnetic layer 5 than the upper magnetic layer 6. In this particular case, the sum total content of Pt having a larger atomic radius than Co and included in the CoCr-based alloy is larger for the lower magnetic layer 5 than the upper magnetic layer 6.

In FIG. 9, the magnetic layer 9 is made up solely of the upper magnetic layer 6 when the value along the abscissa is "0", and the magnetic layer 9 is made up solely of the lower magnetic layer 5 when the value along the abscissa is "1". In addition, the coercivity Hc was measured along a direction in which a track on the magnetic recording medium 10 extends, that is, in a circumferential direction in the case where the magnetic recording medium is a magnetic disk, using a vibrating sample magnetometer. As may be seen from FIG. 9, it was confirmed that the coercivity Hc is improved by the multi-layer structure of the magnetic layer 9 as compared to the case where the magnetic layer 9 is made up solely of the upper magnetic layer 6 or the lower magnetic layer 5, when the sum total Pt-content of the lower magnetic layer 5 is larger than that of the upper magnetic layer 6.

Figure 10:
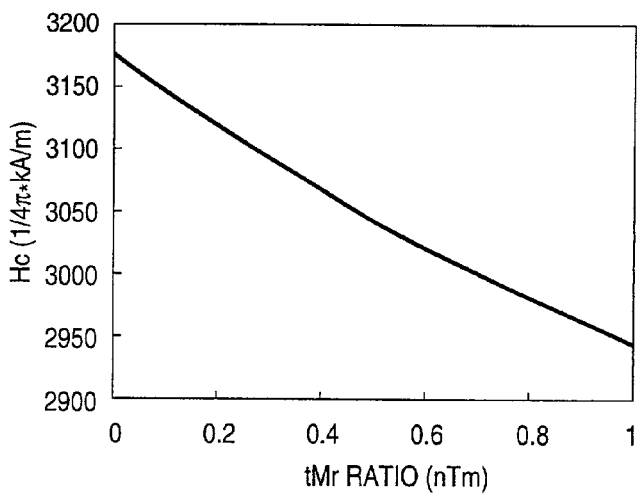
FIG. 10 is a diagram showing a relationship between a coercivity Hc and the TMr ratio of a lower magnetic layer and an upper magnetic layer for a case where a sum total content of the nonmagnetic elements having a larger atomic radius than Co and included in the CoCr-based alloy is larger for the upper magnetic layer than the lower magnetic layer.

On the other hand, FIG. 10 is a diagram for comparison purposes, showing a relationship between a coercivity Hc ($\frac{1}{4}\pi$*kA/m) and the TMr ratio (nTm) of a $Co_{61}Cr_{25}Pt_{10}B_4$-based lower magnetic layer 5 and a $Co_{65}Cr_{22}Pt_{10}Ta_2B_1$-based upper magnetic layer 6 for a case where a sum total content of the nonmagnetic elements having a larger atomic radius than Co and included in the CoCr-based alloy is larger for the upper magnetic layer 6 than the lower magnetic layer 5. In this particular case, the sum total content of Pt having a larger atomic radius than Co and included in the CoCr-based alloy is larger for the upper magnetic layer 6 than the lower magnetic layer 5.

In FIG. 10, the magnetic layer 9 is made up solely of the upper magnetic layer 6 when the value along the abscissa is "0", and the magnetic layer 9 is made up solely of the lower magnetic layer 5 when the value along the abscissa is "1". In addition, the coercivity Hc was measured along a direction in which a track on the magnetic recording medium 10 extends, that is, in a circumferential direction in the case where the magnetic recording medium is a magnetic disk, using a vibrating sample magnetometer. As may be seen from FIG. 10, it was confirmed that the coercivity Hc is not improved by the multi-layer structure of the magnetic layer 9 as compared to the case where the magnetic layer 9 is made up solely of the upper magnetic layer 6 or the lower magnetic layer 5, when the sum total Pt-content of the upper magnetic layer 6 is larger than that of the lower magnetic layer 5.

Figure 11:
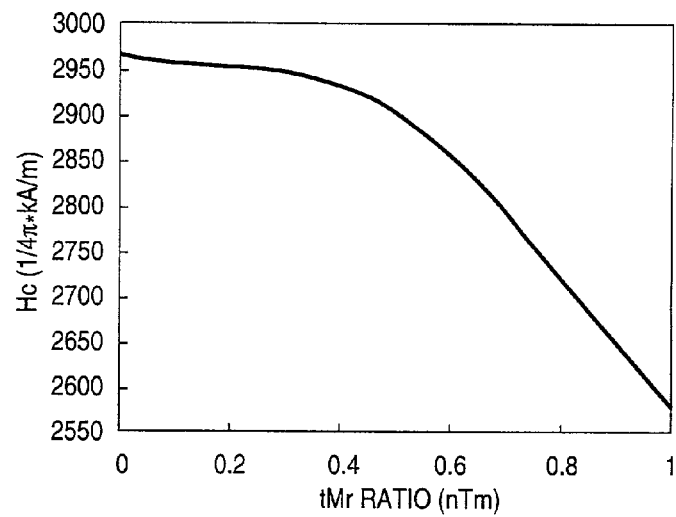
FIG. 11 is a diagram showing a relationship between a coercivity Hc and the TMr ratio of a lower magnetic layer and an upper magnetic layer for a case where a sum total content of the nonmagnetic elements having a larger atomic radius than Co and included in the CoCr-based alloy is the same for the upper magnetic layer and the lower magnetic layer.

In addition, FIG. 11 is a diagram for comparison purposes, showing a relationship between a coercivity Hc ($1/4\pi$kA/m) and the TMr ratio (nTm) of a $Co_{62}Cr_{22}Pt_{10}B_6$-based lower magnetic layer 5 and a $Co_{64}Cr_{20}Pt_{10}B_6$-based upper magnetic layer 6 for a case where a sum total content of the nonmagnetic elements having a larger atomic radius than Co and included in the CoCr-based alloy is the same for the upper magnetic layer 6 and the lower magnetic layer 5. In this particular case, the sum total content of Pt having a larger atomic radius than Co and included in the CoCr-based alloy is the same for the upper magnetic layer 6 and the lower magnetic layer 5.

In FIG. 11, the magnetic layer 9 is made up solely of the upper magnetic layer 6 when the value along the abscissa is "0", and the magnetic layer 9 is made up solely of the lower magnetic layer 5 when the value along the abscissa is "1". In addition, the coercivity Hc was measured along a direction in which a track on the magnetic recording medium 10 extends, that is, in a circumferential direction in the case where the magnetic recording medium is a magnetic disk, using a vibrating sample magnetometer. As may be seen from FIG. 11, it was confirmed that the coercivity Hc is not improved by the multi-layer structure of the magnetic layer 9 as compared to the case where the magnetic layer 9 is made up solely of the upper magnetic layer 6 or the lower magnetic layer 5, when the sum total Pt-content of the upper magnetic layer 6 is the same as that of the lower magnetic layer 5.

Therefore, it was confirmed that a high coercivity Hc, a high S/Nm ratio and a high recording and reproducing resolution Res can be obtained in this first embodiment, when the Cr-content of the CoCr-based alloy is larger for the lower magnetic layer 5 than the upper magnetic layer 6, and a sum total content of nonmagnetic elements which are other than Cr and having a larger atomic radius than Co is larger for the lower magnetic layer 5 than the upper magnetic layer 6. Hence, this first embodiment can realize a high-density recording which is improved compared to the conventional magnetic recording medium which employs a magnetic layer having a single-layer structure.

Figure 12:
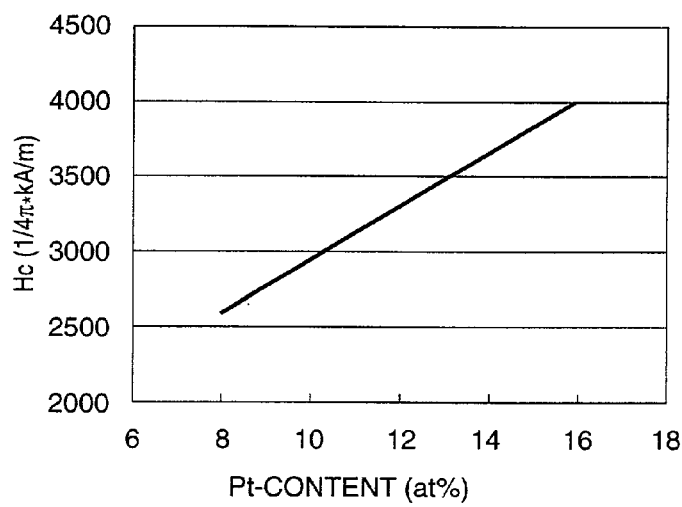
FIG. 12 is a diagram showing a relationship between a coercivity Hc and a Pt-content for a $Co_{(74-x)}Cr_{22}Pt_xB_4$-based magnetic layer.
Figure 13:
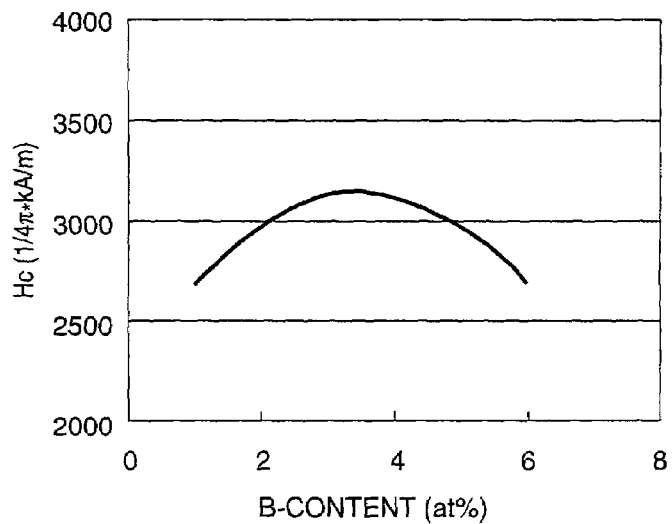
FIG. 13 is a diagram showing a relationship between a coercivity Hc and a B-content for a $Co_{(65-x)}Cr_{23}Pt_{12}B_x$-based magnetic layer.
Figure 14:
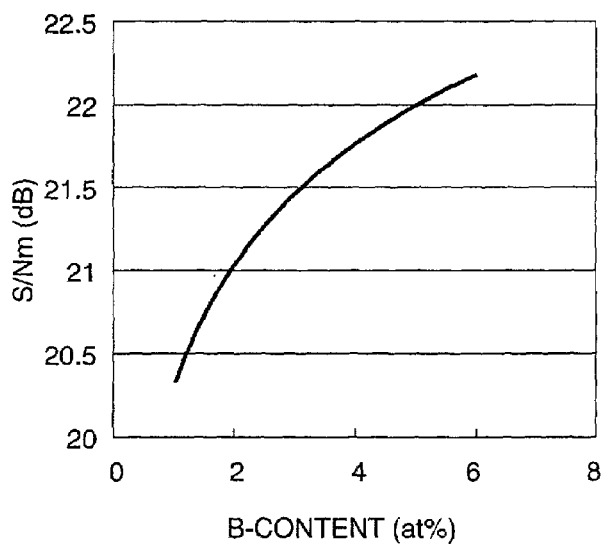
FIG. 14 is a diagram showing a relationship between a S/Nm ratio and a B-content for a $Co_{(65-x)}Cr_{23}Pt_{12}B_x$-based magnetic layer.

It was also confirmed that, the CoCr-based alloy used for the lower and upper magnetic layers 5 and 6 preferably includes approximately 8 to 15 at % of Pt and approximately 1 to 6 at % of B, as may be seen from FIGS. 12, 13 and 14. FIG. 12 is a diagram showing a relationship between a coercivity Hc ($1/4\pi$*kA/m) and a Pt-content (at %) for a $Co_{(74-x)}Cr_{22}Pt_xB_4$-based magnetic layer. FIG. 13 is a diagram showing a relationship between a coercivity Hc ($1/4\pi$*kA/m) and a B-content (at %) for a $Co_{(65-x)}Cr_{23}Pt_{12}B_x$-based magnetic layer. In addition, FIG. 14 is a diagram showing a relationship between a S/Nm ratio (dB) and a B-content (at %) for a $Co_{(65-x)}Cr_{23}Pt_{12}B_x$-based magnetic layer.

In other words, as shown in FIG. 12, the coercivity Hc increases monotonously with increasing Pt-content. In order to realize a high-density magnetic recording medium, the coercivity Hc must be high on the order of 2500 ($1/4\pi$*kA/m). The Pt-content must be 8 at % or greater in order to obtain the coercivity Hc of 2500 ($1/4\pi$*kA/m) or greater. In addition, the media noise Nm increases when the Pt-content is increased in order to increase the coercivity Hc. Accordingly, the Pt-content for obtaining the high coercivity Hc and the low media noise Nm is in the range of approximately 8 to 15 at %.

On the other hand, the coercivity Hc has a peak when the B-content is approximately 4 at % as shown in FIG. 13, but tends to decrease as the B-content is further increased. Furthermore, the S/Nm ratio also increases as the B-content increases, as may be seen from FIG. 14. Therefore, the B-content for obtaining the high coercivity Hc and the high S/Nm ratio is in the range of approximately 1 to 6 at %.

It was also confirmed that the first underlayer 2 is preferably made of Cr with a thickness of approximately 10 nm or less, and the second underlayer 3 is preferably made of a Cr-based alloy including at least one element selected from a group of Mo, Ti, W, V and Ta, such that a sum total of elements other than Cr is larger for the second underlayer 3 than the first underlayer 2. Moreover, it was confirmed that the thickness of the Co-based intermediate layer 4 is preferably approximately 3 nm or less.

Figure 15:
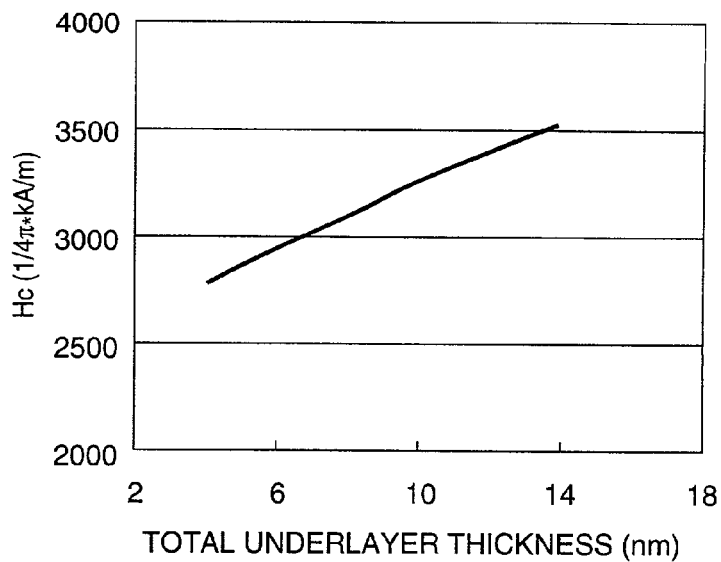
FIG. 15 is a diagram showing a relationship between a coercivity Hc and a total underlayer thickness for a first Cr underlayer and a second CrMo underlayer.
Figure 16:
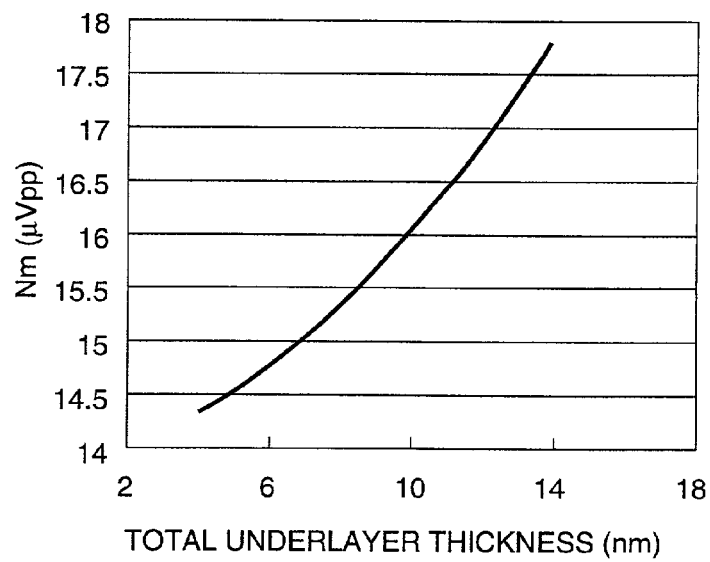
FIG. 16 is a diagram showing a media noise Nm and a total underlayer thickness for a first Cr underlayer and a second CrMo underlayer.
Figure 17:
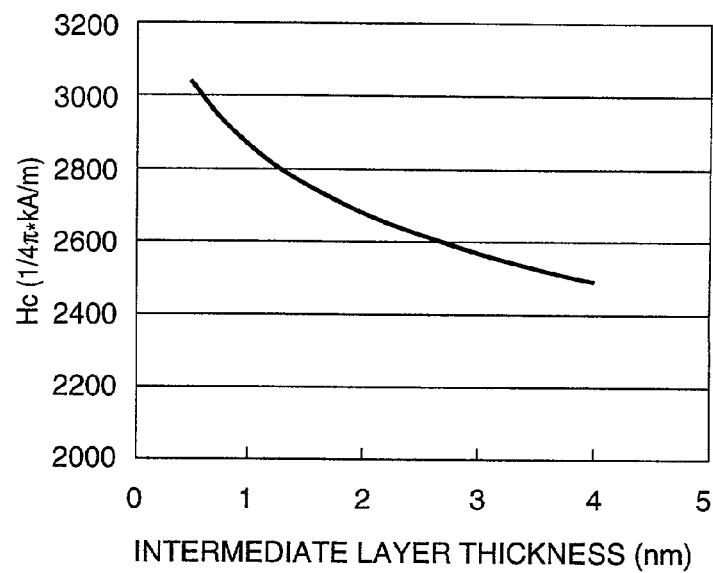
FIG. 17 is a diagram showing a relationship between a coercivity Hc and a CoCr intermediate layer thickness.
Figure 18:
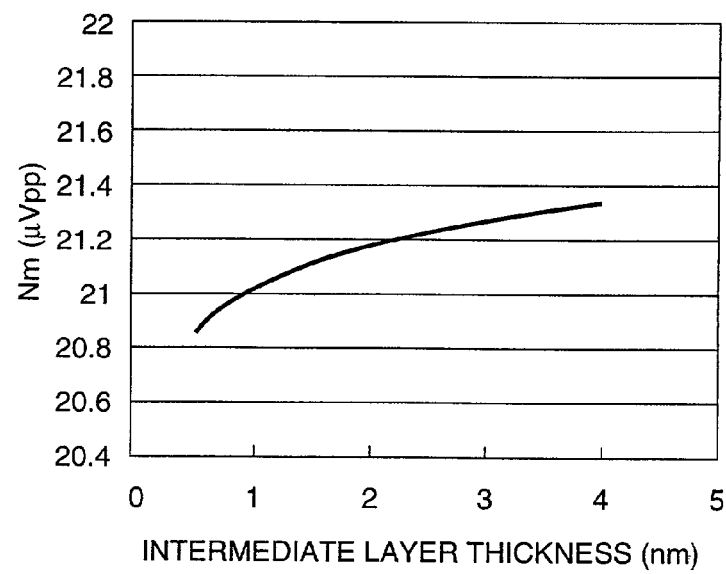
FIG. 18 is a diagram showing a relationship between a media noise Nm and a CoCr intermediate layer thickness.

FIG. 15 is a diagram showing a relationship between a coercivity Hc ($1/4\pi$*kA/m) and a total underlayer thickness (nm) for a first Cr underlayer and a second CrMo underlayer. FIG. 16 is a diagram showing a media noise Nm ($\mu$Vpp) and a total underlayer thickness (nm) for a first Cr underlayer and a second CrMo underlayer. FIG. 17 is a diagram showing a relationship between a coercivity Hc ($1/4\pi$*kA/m) and a CoCr intermediate layer thickness (nm). In addition, FIG. 18 is a diagram showing a relationship between a media noise Nm ($\mu$Vpp) and a CoCr intermediate layer thickness (nm).

As shown in FIG. 15, the coercivity Hc increases monotonously with increasing total underlayer thickness. However, as shown in FIG. 16, the media noise Nm also increases with increasing total underlayer thickness. Accordingly, the total underlayer thickness of the first and second underlayers 2 and 3 for obtaining the high coercivity Hc and the low media noise Nm is approximately 10 nm or less. Furthermore, the coercivity Hc decreases with increasing CoCr intermediate layer thickness, as shown in FIG. 17. But as shown in FIG. 18, the media noise Nm increases with increasing CoCr intermediate layer thickness. Accordingly, the CoCr intermediate layer thickness for obtaining the high coercivity Hc and the low media noise Nm is approximately 3 nm or less.

Figure 19:
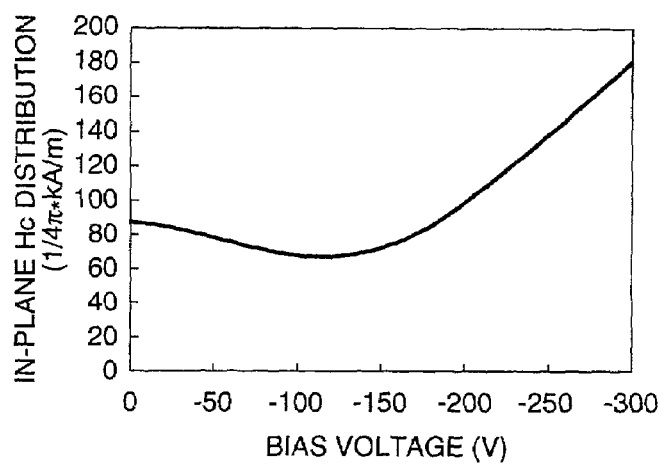
FIG. 19 is a diagram showing an in-plane coercivity distribution with respect to a substrate bias voltage when depositing a first underlayer.
Figure 20:
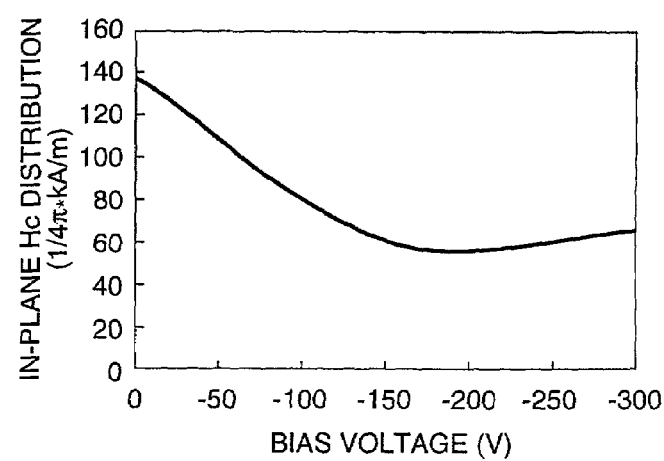
FIG. 20 is a diagram showing the in-plane coercivity distribution with respect to the substrate bias voltage when depositing a second underlayer.

When producing the magnetic recording medium 10 by this first embodiment of the method, it is desirable that an in-plane coercivity distribution is small. The in-plane coercivity distribution refers to a difference between maximum and minimum values of the in-plane coercivity of the magnetic recording medium 10. FIG. 19 is a diagram showing an in-plane coercivity (Hc) distribution with respect to a substrate bias voltage when depositing the first underlayer 2, and FIG. 20 is a diagram showing the in-plane coercivity (Hc) distribution with respect to the substrate bias voltage when depositing the second underlayer 3. In FIGS. 19 and 20, the ordinate indicates the in-plane coercivity (Hc) distribution ($1/4\pi$*kA/m), and the abscissa indicates the substrate bias voltage (V) applied on the substrate 1.

It was confirmed from FIGS. 19 and 20 that the substrate bias voltage when depositing the first underlayer 2 is approximately 0 to −150 V and the substrate bias voltage when depositing the second under layer 3 is approximately −100 to −300 V, in order to obtain a sufficiently small in-plane coercivity distribution of approximately 100 or less.

Next, a description will be given of a second embodiment of the magnetic recording medium according to the present invention. The basic structure of this second embodiment of the magnetic recording medium is the same as that of the first embodiment shown in FIG. 2. This second embodiment of the magnetic recording medium is produced by a second embodiment of a method of producing a magnetic recording medium according to the present invention.

In this second embodiment, the nonmagnetic substrate 1 is made of an Al substrate having a surface which is plated with a NiP layer and is subjected to a texturing process. The first underlayer 2 is made of a Cr-based alloy having a thickness of 6 nm, the second underlayer 3 is made of a CrMo-based alloy having a thickness of 3 nm, and the intermediate layer 4 is made of a Co-based alloy having a thickness of 2 nm. The lower and upper magnetic layers 5 and 6 are made of a CoCr-based alloy including at least one element selected from a group of nonmagnetic elements of Pt, Ta, W and B. For example, the lower magnetic layer 5 is made of a $Co_{63}Cr_{23}Pt_{12}Ta_1B_1$-based alloy having a thickness of 11 nm, and the upper magnetic layer 6 is made of a $Co_{64}Cr_{20}Pt_{10}B_6$-based alloy having a thickness of 9.5 nm.

According to this second embodiment of the method of producing the magnetic recording medium, the inside of a sputtering chamber of a known sputtering apparatus (not shown) is exhausted to $4 \times 10^{-5}$ Pa or less prior to the sputtering. The nonmagnetic substrate 1 is heated to a substrate temperature of 220° C., and Ar gas is introduced into the sputtering chamber to maintain the pressure inside the sputtering chamber to $6.7 \times 10^{-1}$ Pa. In this state, the first and second underlayers 2 and 3, the intermediate layer 4, the lower and upper magnetic layers 5 and 6, and the protection layer 7 are successively deposited by continuous sputtering.

In this second embodiment, a Cr-content of the CoCr-based alloy is larger for the lower magnetic layer 5 than the upper magnetic layer 6. Furthermore, a sum total content of Ta and Pt having a larger atomic radius than Co is larger for the lower magnetic layer 5 than the upper magnetic layer 6. In other words, a sum total content of the nonmagnetic elements having a larger atomic radius than Co and included in the CoCr-based alloy is larger for the lower magnetic layer 5 than the upper magnetic layer 6.

Figure 21:
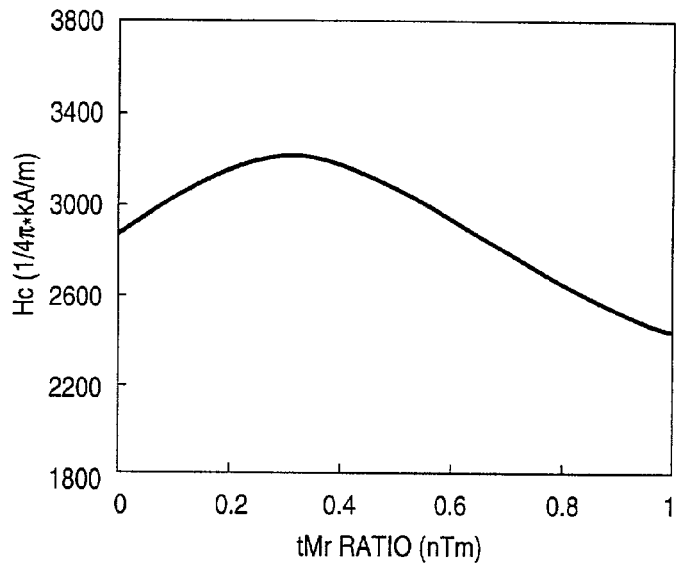
FIG. 21 is a diagram showing a relationship between a coercivity Hc and the TMr ratio of the lower magnetic layer and the upper magnetic layer of a second embodiment of the magnetic recording medium, where the sum total content of the nonmagnetic elements having a larger atomic radius than Co and included in the CoCr-based alloy is larger for the lower magnetic layer than the upper magnetic layer.

FIG. 21 is a diagram showing a relationship between a coercivity Hc ($\frac{1}{4}\pi^*$kA/m) and the TMr ratio (nTm) of the $Co_{63}Cr_{23}Pt_{12}Ta_1B_1$-based lower magnetic layer 5 and the $Co_{64}Cr_{20}Pt_{10}B_6$-based upper magnetic layer 6 of this second embodiment, where the sum total content of the nonmagnetic elements Ta and Pt having a larger atomic radius than Co and included in the CoCr-based alloy is larger for the lower magnetic layer 5 than the upper magnetic layer 6.

In FIG. 21, the magnetic layer 9 is made up solely of the upper magnetic layer 6 when the value along the abscissa is "0", and the magnetic layer 9 is made up solely of the lower magnetic layer 5 when the value along the abscissa is "1". In addition, the coercivity Hc was measured along a direction in which a track on the magnetic recording medium 10 extends, that is, in a circumferential direction in the case where the magnetic recording medium is a magnetic disk, using a vibrating sample magnetometer. As may be seen from FIG. 21, it was confirmed that the coercivity Hc is improved by the multi-layer structure of the magnetic layer 9 as compared to the case where the magnetic layer 9 is made up solely of the upper magnetic layer 6 or the lower magnetic layer 5, when the sum total of the Ta-content and the Pt-content of the lower magnetic layer 5 is larger than that of the upper magnetic layer 6.

Figure 22:
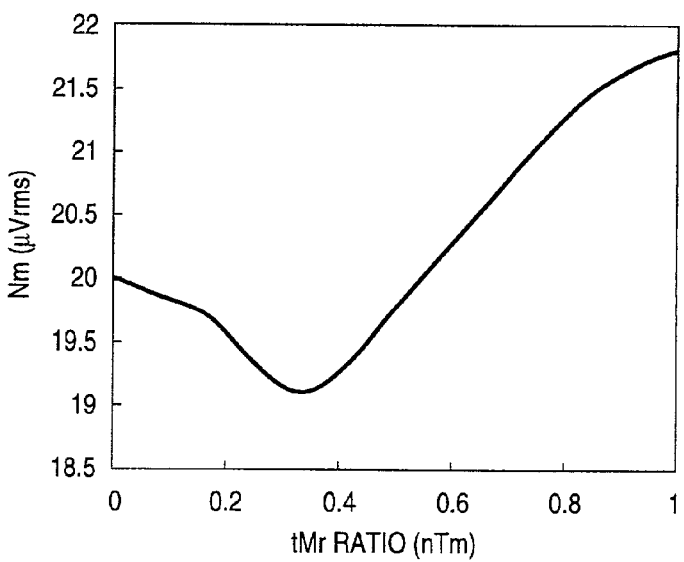
FIG. 22 is a diagram showing a relationship between a media noise Nm at a recording density of 530 kfci and the tMr ratio of the lower magnetic layer and the upper magnetic layer of the second embodiment, where the Cr-content of the lower magnetic layer is larger than that of the upper magnetic layer.

FIG. 22 is a diagram showing a relationship between a media noise Nm (µVrms) at a recording density of 530 kfci and the tMr ratio (nTm) of the $Co_{63}Cr_{23}Pt_{12}Ta_1B_1$-based lower magnetic layer 5 and the $Co_{64}Cr_{20}Pt_{10}B_6$-based upper magnetic layer 6 of this second embodiment, where the Cr-content of the lower magnetic layer 5 is larger than that of the upper magnetic layer 6.

In FIG. 22, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 22, it was confirmed that the media noise Nm is reduced by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 23:
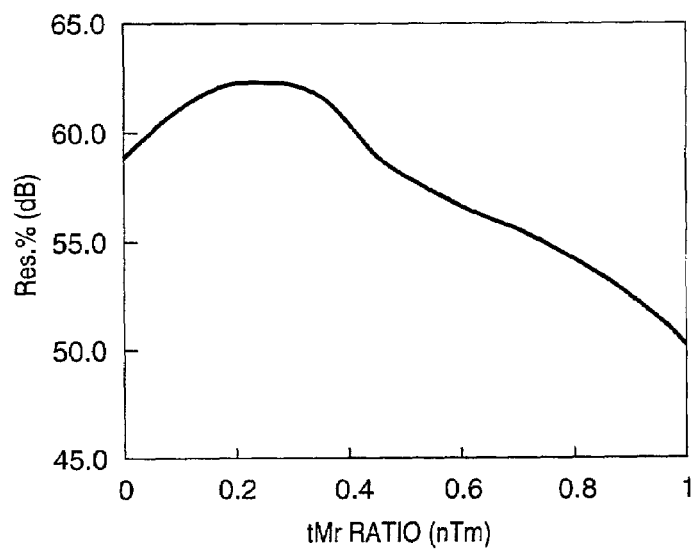
FIG. 23 is a diagram showing a relationship between a recording and reproducing resolution Res and the tMr ratio of the lower magnetic layer and the upper magnetic layer of the second embodiment, where the Cr-content of the lower magnetic layer is larger than that of the upper magnetic layer.

FIG. 23 is a diagram showing a relationship between a recording and reproducing resolution Res (%) and the tMr ratio (nTm) of the $Co_{63}Cr_{23}Pt_{12}Ta_1B_1$-based lower magnetic layer 5 and the $Co_{64}Cr_{20}Pt_{10}B_6$-based upper magnetic layer 6 of this second embodiment, where the Cr-content of the lower magnetic layer 5 is larger than that of the upper magnetic layer 6.

In FIG. 23, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 23, it was confirmed that the recording and reproducing resolution Res is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Figure 24:
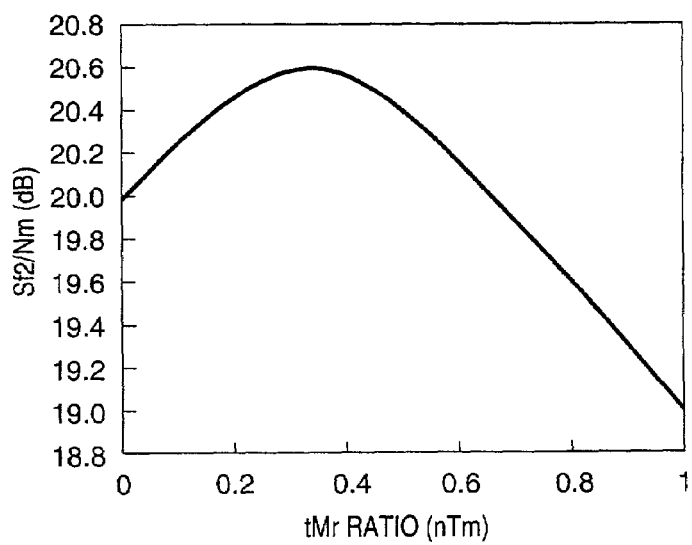
FIG. 24 is a diagram showing a relationship between a media signal-to-noise ratio (Sf2/Nm) at a recording density of 530 kfci and the tMr ratio of the lower magnetic layer and the upper magnetic layer of the second embodiment where the Cr-content of the lower magnetic layer is larger than that of the upper magnetic layer.

FIG. 24 is a diagram showing a relationship between a media signal-to-noise ratio (Sf2/Nm) (dB) at a recording density of 530 kfci and the tMr ratio (nTm) of the $Co_{63}Cr_{23}Pt_{12}Ta_1B_1$-based lower magnetic layer 5 and the $Co_{64}Cr_{20}Pt_{10}B_6$-based upper magnetic layer 6, where the Cr-content of the lower magnetic layer 5 is larger than that of the upper magnetic layer 6.

In FIG. 24, the magnetic layer 9 is made up solely of the upper magnetic layer 6 when the value along the abscissa is "0", and the magnetic layer 9 is made up solely of the lower magnetic layer 5 when the value along the abscissa is "1". As may be seen from FIG. 24, it was confirmed that the Sf2/Nm ratio is improved by the multi-layer structure of the magnetic layer 9 as compared to the case where the magnetic layer 9 is made up solely of the upper magnetic layer 6 or the lower magnetic layer 5, when the Cr-content of the lower magnetic layer 5 is larger than that of the upper magnetic layer 6.

Therefore, it was confirmed that a high coercivity Hc, a high S/Nm ratio and a high recording and reproducing resolution Res can be obtained in this second embodiment, when the Cr-content of the CoCr-based alloy is larger for the lower magnetic layer 5 than the upper magnetic layer 6, and a sum total content of nonmagnetic elements which are other than Cr and having a larger atomic radius than Co is larger for the lower magnetic layer 5 than the upper magnetic layer 6. Hence, this second embodiment can realize a high-density recording which is improved compared to the conventional magnetic recording medium which employs a magnetic layer having a single-layer structure. It was also confirmed that, the CoCr-based alloy used for the lower and upper magnetic layers 5 and 6 preferably includes approximately 8 to 15 at % of Pt and approximately 1 to 6 at % of B.

Similarly as in the case of the first embodiment, it was also confirmed that the first underlayer 2 is preferably made of Cr with a thickness of approximately 10 nm or less, and the second underlayer 3 is preferably made of a Cr-based alloy including at least one element selected from a group of Mo, Ti, W, V and Ta, such that a sum total of elements other than Cr is larger for the second underlayer 3 than the first underlayer 2. Moreover, it was confirmed that the thickness of the Co-based intermediate layer 4 is preferably approximately 3 nm or less.

When producing the magnetic recording medium 10 by this second embodiment of the method, it is desirable that an in-plane coercivity distribution is small. Hence, similarly as in the case of the first embodiment, it is preferable that the substrate bias voltage when depositing the first underlayer 2 is approximately 0 to −150 V and the substrate bias voltage when depositing the second under layer 3 is approximately −100 to −300 V, in order to obtain a sufficiently small in-plane coercivity distribution of approximately 100 or less.

Figure 25:
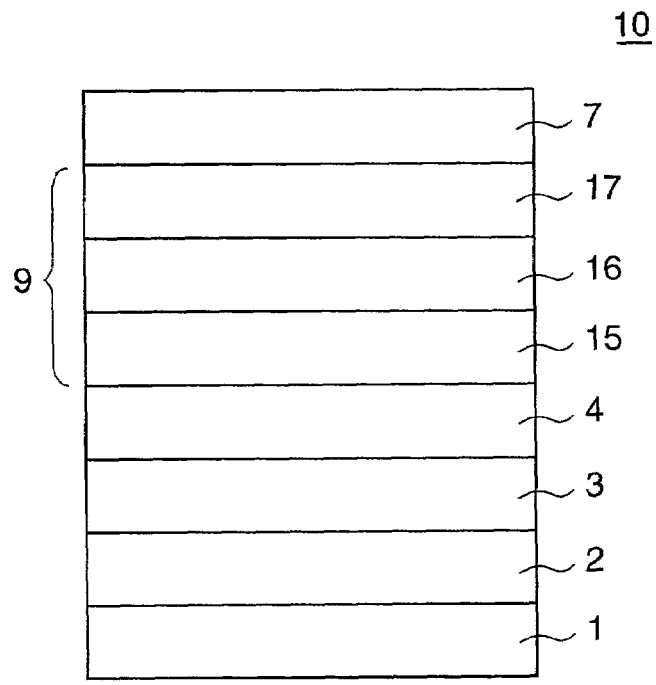
FIG. 25 is a cross sectional view showing an important part of a third embodiment of the magnetic recording medium according to the present invention.

Next, a description will be given of a third embodiment of the magnetic recording medium according to the present invention. FIG. 25 is a cross sectional view showing an important part of this third embodiment of the magnetic recording medium. In FIG. 25, those parts which are the same as those corresponding parts in FIG. 2 are designated by the same reference numerals, and a description thereof will be omitted. This third embodiment of the magnetic recording medium is produced by a third embodiment of the method of producing the magnetic recording medium according to the present invention.

As shown in FIG. 25, the magnetic layer 9 has a multi-layer structure made up of a lower magnetic layer 15, a middle magnetic layer 16, and an upper magnetic layer 17. The lower, middle and upper magnetic layers 15, 16 and 17 are made of a CoCr-based alloy including at least one element selected from a group of nonmagnetic elements of Pt, Ta, W and B. For example, the lower magnetic layer 15 is made of a $Co_{59}Cr_{25}Pt_{12}B_4$-based alloy having a thickness of 7 nm, the middle magnetic layer 16 is made of a $Co_{62}Cr_{22}Pt_{10}B_6$-based alloy having a thickness of 6.5 nm, and the upper magnetic layer 17 is made of a $Co_{66}Cr_{19}Pt_9B_6$-based alloy having a thickness of 5.5 nm, where the subscripts affixed to each element indicates at %.

In this third embodiment, a Cr-content of the CoCr-based alloy is larger for the lower magnetic layer 15 than the middle magnetic layer 16, and larger for the middle magnetic layer 16 than the upper magnetic layer 17. Furthermore, a sum total content of Pt having a larger atomic radius than Co is larger for the lower magnetic layer 15 than-the middle magnetic layer 16, and larger for the middle magnetic layer 16 than the upper magnetic layer 17. In other words, a sum total content of the nonmagnetic elements having a larger atomic radius than Co and included in the CoCr-based alloy is largest for the lower magnetic layer 15, second for the middle magnetic layer 16, and smallest for the upper magnetic layer 17.

Figure 26:
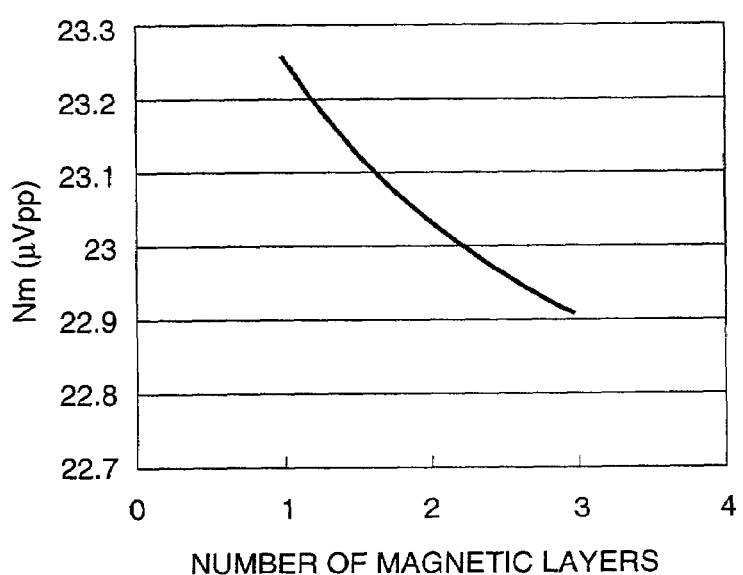
FIG. 26 is a diagram showing a relationship between a media noise Nm and a number of magnetic layers forming the multi-layer structure of the magnetic layer.

FIG. 26 is a diagram showing a relationship between a media noise Nm (μVpp) and a number of magnetic layers forming the multi-layer structure of the magnetic layer 9. As may be seen from FIG. 26, the magnetic layer 9 having the multi-layer structure made up of the three magnetic layers 15, 16 and 17 has the smallest media noise Nm, and the media noise Nm is even further reduced compared to the magnetic layer 9 having the multi-layer structure made up of two magnetic layers 5 and 6 as in the case of the second embodiment described above.

Of course, the number of magnetic layers forming the multi-layer structure of the magnetic layer 9 is not limited to three. In other words, two or more middle layers 16 may be provided between the lower magnetic layer 15 and the upper magnetic layer 17. In a case where two or more middle layers 16 are provided, the Cr-content of the CoCr-based alloy is larger for the lower magnetic layer 15 than the lowermost middle magnetic layer 16, and larger for the uppermost middle magnetic layer 16 than the upper magnetic layer 17. In addition, among the middle magnetic layers 16, the Cr content is desirably larger for the lower middle magnetic layers 16 closer to the lower magnetic layer 15 than the upper middle magnetic layers 16 closer to the upper magnetic layer 17. Furthermore, the sum total content of Pt having a larger atomic radius than Co is larger for the lower magnetic layer 15 than the lowermost middle magnetic layer 16, and larger for the uppermost middle magnetic layer 16 than the upper magnetic layer 17. Moreover, among the middle magnetic layers 16, the Pt-content is desirably larger for the lower middle magnetic layers 16 closer to the lower magnetic layer 15 than the upper middle magnetic layers 16 closer to the upper magnetic layer 17. In other words, the sum total content of the nonmagnetic elements having a larger atomic radius than Co and included in the CoCr-based alloy is largest for the lower magnetic layer 15, second for the middle magnetic layers 16 and desirably smaller for the middle magnetic layers 16 disposed closer to the upper magnetic layer 17, and smallest for the upper magnetic layer 17.

Figure 27:
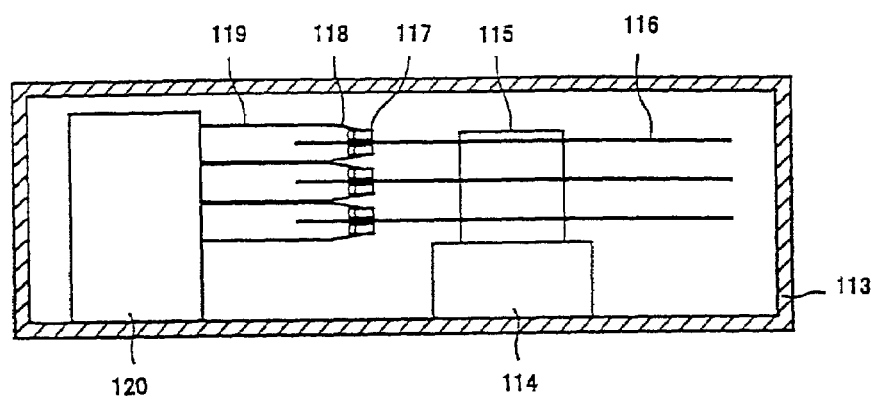
FIG. 27 is a cross sectional view showing an important part of an embodiment of a magnetic storage apparatus according to the present invention.

Next, a description will be given of an embodiment of a magnetic storage apparatus according to the present invention, by referring to FIGS. 27 and 28. FIG. 27 is a cross sectional view showing an important part of this embodiment of the magnetic storage apparatus according to the present invention, and FIG. 28 is a plan view showing the important part of this embodiment of the magnetic storage apparatus.

Figure 28:
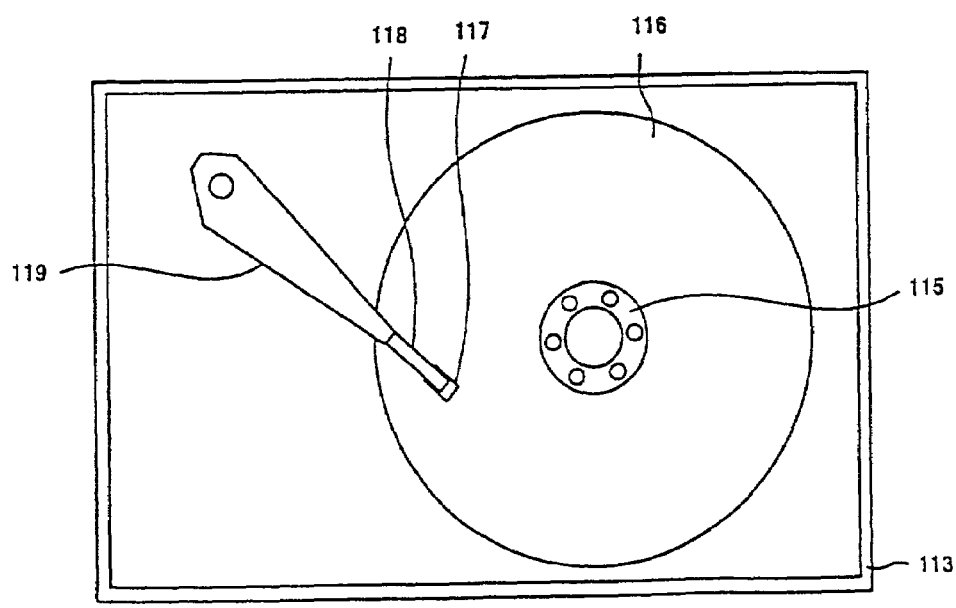
FIG. 28 is a plan view showing the important part of the embodiment of the magnetic storage apparatus.

As shown in FIGS. 27 and 28, the magnetic storage apparatus generally includes a housing 113. A motor 114, a hub 115, a plurality of magnetic recording media 116, a plurality of recording and reproducing (read and write) heads 117, a plurality of suspensions 118, a plurality of arms 119, and an actuator unit 120 are provided within the housing 113. The magnetic recording media 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments of the magnetic recording medium described above. Of course, the number of magnetic recording media 116 is not limited to three, and only one, two or four or more magnetic recording media 116 may be provided.

The basic construction of the magnetic storage apparatus is not limited to that shown in FIGS. 27 and 28. In addition, the magnetic recording medium used in the present invention is not limited to a magnetic disk, and the magnetic recording medium may take an arbitrary form or shape other than the disk-shape.

Further, the present invention is not limited to these embodiments, but various variations and modifications may be made without departing from the scope of the present invention.

What is claimed is:

1. A magnetic recording medium comprising:
    a substrate;
    a magnetic layer, including a CoCr-based alloy and nonmagnetic elements other than Cr, and having a multi-layer structure and disposed above said substrate,
    said multi-layer structure having a first magnetic layer disposed above said substrate and at least one second magnetic layer disposed directly on said first magnetic layer on an opposite side from said substrate;
    a first underlayer including a Cr-based alloy and disposed on said substrate;
    a second underlayer including a Cr-based alloy and disposed between said first underlayer and said first magnetic layer, said second underlayer including at least one element selected from a group consisting of Mo, W, V and Ta; and
    an intermediate layer made of a Co-based alloy and disposed between said second underlayer and said first magnetic layer,
    said first magnetic layer having a Cr-content larger than that of said second magnetic layer,
    said first magnetic layer having a larger sum total content of nonmagnetic elements which are other than Cr and which nonmagnetic elements have a larger atomic radius than Co compared to said second magnetic layer,
    said second underlayer having a larger sum total content of elements, other than Cr, than said first underlayer.

2. The magnetic recording medium as claimed in claim 1, wherein said first and second magnetic layers include at least one nonmagnetic element selected from a group consisting of Pt, Ta, W and B.

3. A magnetic recording medium comprising:
    a substrate;
    a magnetic layer, including a CoCr-based alloy and nonmagnetic elements other than Cr, and having a multi-layer structure and disposed above said substrate,
    said multi-layer structure having a first magnetic layer disposed above said substrate and at least one second magnetic layer disposed directly on said first magnetic layer on an opposite side from said substrate;
    a first underlayer including a Cr-based alloy and disposed on said substrate; and
    a second underlayer including a Cr-based alloy and disposed between said first underlayer and said first magnetic layer, said second underlayer including at least one element selected from a group consisting of Mo, W, V and Ta;
    said first magnetic layer having a Cr-content larger than that of said second magnetic layer,
    said first magnetic layer having a larger sum total content of nonmagnetic elements which are other than Cr and which nonmagnetic elements have a larger atomic radius than Co compared to said second magnetic layer,
    said second underlayer having a larger sum total content of elements, other than Cr, than said first underlayer;
    wherein said first and second magnetic layers include approximately 8 to 15 at % of Pt, and approximately 1 to 6 at % of B.

4. A magnetic recording medium comprising:
    a substrate;
    a magnetic layer, including a CoCr-based alloy and nonmagnetic elements other than Cr, and having a multi-layer structure and disposed above said substrate,
    said multi-layer structure having a first magnetic layer disposed above said substrate and a plurality of second magnetic layers including one second magnetic layer disposed directly on said first magnetic layer on an opposite side from said substrate;
    a first underlayer including a Cr-based alloy and disposed on said substrate; and
    a second underlayer including a Cr-based alloy and disposed between said first underlayer and said first magnetic layer, said second underlayer including at least one element selected from a group consisting of Mo, W, V and Ta,
    said second underlayer having a larger sum total content of elements, other than Cr, than said first underlayer;
    wherein:
    said first magnetic layer has a Cr-content larger than that of a lowermost one of said second magnetic layers disposed closest to said first magnetic layer,
    said first magnetic layer has a larger sum total content of nonmagnetic elements which are other than Cr and which nonmagnetic elements have a larger atomic radius than Co compared to the lowermost one of said second magnetic layers, and
    between two mutually adjacent second magnetic layers, the Cr-content and the sum total content of the nonmagnetic elements are respectively larger for a second magnetic layer disposed closer to said first magnetic layer.

5. A method of producing a magnetic recording medium which includes a magnetic layer including a CoCr-based alloy and nonmagnetic elements other than Cr and having a multi-layer structure, comprising the steps of:
    (a) forming a first magnetic layer on a base layer;
    (b) forming at least one second magnetic layer directly on the first magnetic layer,
    said steps (a) and (b) being carried out so that a Cr-content of the first magnetic layer is larger than that of the second magnetic layer, and a sum total content of nonmagnetic elements which are other than Cr and which nonmagnetic elements have a larger atomic radius than Co in the first magnetic layer is larger compared to that of the second magnetic layer;
    (c) forming a first underlayer made of a Cr-based alloy on a substrate;
    (d) forming a second underlayer made of a Cr-based alloy between the first underlayer and the first magnetic layer, said second underlayer including at least one element selected from a group consisting of Mo, W, V and Ta; and
    (e) forming, as the base layer, an intermediate layer made of a Co-based alloy between the second underlayer and the first magnetic layer,
    said steps (c) and (d) being carried out so that the second underlayer has a larger sum total content of elements, other than Cr, than the first underlayer.

6. The method of producing the magnetic recording medium as claimed in claim 5, wherein said steps (a) and (b) form the first and second magnetic layers to include at least one nonmagnetic element selected from a group consisting of Pt, Ta, W and B.

7. A method of producing a magnetic recording medium which includes a magnetic layer including a CoCr-based alloy and nonmagnetic elements other than Cr and having a multi-layer structure, comprising the steps of:

(a) forming a first magnetic layer on a base layer;
(b) forming at least one second magnetic layer directly on the first magnetic layer,
said steps (a) and (b) being carried out so that a Cr-content of the first magnetic layer is larger than that of the second magnetic layer, and a sum total content of nonmagnetic elements which are other than Cr and which nonmagnetic elements have a larger atomic radius than Co in the first magnetic layer is larger compared to that of the second magnetic layer;
(c) forming a first underlayer made of a Cr-based alloy on a substrate;
(d) forming a second underlayer made of a Cr-based alloy between the first underlayer and the first magnetic layer, said second underlayer including at least one element selected from a group consisting of Mo, W, V and Ta;
said steps (c) and (d) being carried out so that the second underlayer has a larger sum total content of elements, other than Cr, than the first underlayer;
wherein said steps (a) and (b) form the first and second magnetic layers to include approximately 8 to 15 at % of Pt, and approximately 1 to 6 at % of B.

8. A method of producing a magnetic recording medium which includes a magnetic layer including a CoCr-based alloy and nonmagnetic elements other than Cr and having a multi-layer structure, comprising the steps of:
(a) forming a first magnetic layer on a base layer;
(b) forming at least one second magnetic layer directly on the first magnetic layer,
said steps (a) and (b) being carried out so that a Cr-content of the first magnetic layer is larger than that of the second magnetic layer, and a sum total content of nonmagnetic elements which are other than Cr and which nonmagnetic elements have a larger atomic radius than Co in the first magnetic layer is larger compared to that of the second magnetic layer;
(c) forming a first underlayer made of a Cr-based alloy on a substrate; and
(d) forming a second underlayer made of a Cr-based alloy between the first underlayer and the first magnetic layer, said second underlayer including at least one element selected from a group consisting of Mo, W, V and Ta;
said steps (c) and (d) being carried out so that the second underlayer has a larger sum total content of elements, other than Cr, than the first underlayer;
wherein:
said step (b) forms a plurality of second magnetic layers;
said steps (a) and (b) are carried out so that the Cr-content of the first magnetic layer is larger than that of a lowermost one of the second magnetic layers disposed closest to the first magnetic layer, the sum total content of nonmagnetic elements which are other than Cr and have the larger atomic radius than Co of the first magnetic layer is larger than the lowermost one of the second magnetic layers, and between two mutually adjacent second magnetic layers the Cr-content and the sum total content of the nonmagnetic elements are respectively larger for a second magnetic layer disposed closest to the first magnetic layer.

9. A magnetic storage apparatus comprising:
a head; and
at least one magnetic recording medium provided with a substrate, a magnetic layer made of a CoCr-based alloy, having a multi-layer structure and disposed above the substrate, said multi-layer structure having a first magnetic layer disposed above said substrate and at least one second magnetic layer disposed directly on said first magnetic layer on an opposite side from said substrate, a first underlayer including a Cr-based alloy and disposed on said substrate, and a second underlayer including a Cr-based alloy and disposed between said first underlayer and said magnetic layer, and an intermediate layer made of a Co-based alloy and disposed between said second underlayer and said first magnetic layer, said second underlayer including at least one element selected from a group consisting of Mo, W, V and Ta;
said first magnetic layer having a Cr-content larger than that of said second magnetic layer, and having a larger sum total content of nonmagnetic elements which are other than Cr and have a larger atomic radius than Co than said second magnetic layer,
said second underlayer having a larger sum total content of elements, other than Cr, than said first underlayer.

* * * * *